United States Patent Office 3,387,629
Patented June 11, 1968

3,387,629
HOT WATER HEATING SYSTEM AND
REGULATING VALVE THEREFOR
Charles A. Ellis, Marion, Mass., assignor to General Fittings Co., Warwick, R.I., a corporation of Rhode Island
Filed Aug. 30, 1965, Ser. No. 483,624
1 Claim. (Cl. 137—614.19)

ABSTRACT OF THE DISCLOSURE

A regulating valve for forced hot water heating systems and the like comprising means for automatically shutting off the water supply whenever pressure in the system reaches a predetermined level and which automatically opens whenever pressure in the system falls below the predetermined level, said value also having manual means for permitting opening and closing of the valve regardless of what pressure exists in the system and check valve means associated therewith for preventing backflow of hot water into the supply line.

---

The present invention relates generally to forced hot water heating systems for homes and the like, and is more particularly concerned with the provision of a novel and improved pressure regulating valve therefor.

A primary object of the instant invention is the provision of a regulating valve of the character above described which enables the hot water system to be rapidly filled with water and which effects automatic cut-off of the water supply whenever pressure in the system reaches a predetermined level.

Another object of the instant invention is the provision of a regulating valve of the character above described which not only closes automatically when pressure in the system reaches a predetermined level, but which also automatically reopens whenever pressure in the system falls below the predetermined value.

A further object is the provision of a value of the character described wherein means are provided for controlling the opening and closing of the valve manually when desired, no matter what pressure exists in the system.

Another object is the provision of a valve of the character described combining an automatic pressure reducing fill valve, a reverse-flow check valve, and a supply water manual shut-off means, all within one relatively small housing, said housing having three integral connections for enabling the valve to be simultaneously connected to the water supply conduit, the expansion tank conduit, and the conduit leading to the boiler.

A further object is the provision of a valve of the character described having its own diaphragm and spring for effecting automatic pressure regulation, whereupon a special expansion tank having pressure control means is not required.

Still another object is the provision of a valve of the character described that may be easily and conveniently installed, since the usual installation will not require a separate and special water pipe provision from the valve to the boiler.

A further object is the provision of a valve of the character described that is economically feasible to manufacture, durable in use, and effective in operation.

Other objects, features and advantages of the invention will become apparent as the description thereof proceeds when considered in connection with the accompanying illustrative drawings.

In the drawings, which illustrate the best mode presently contemplated for carrying out the present invention:

FIG. 3 is a section taken on line 3—3 of FIG. 2;

FIG. 4 is an exploded perspective view of some of the interior parts of the valve; and FIG. 5 is a perspective view of the check valve plate that forms a part of the instant invention.

Figure 1:
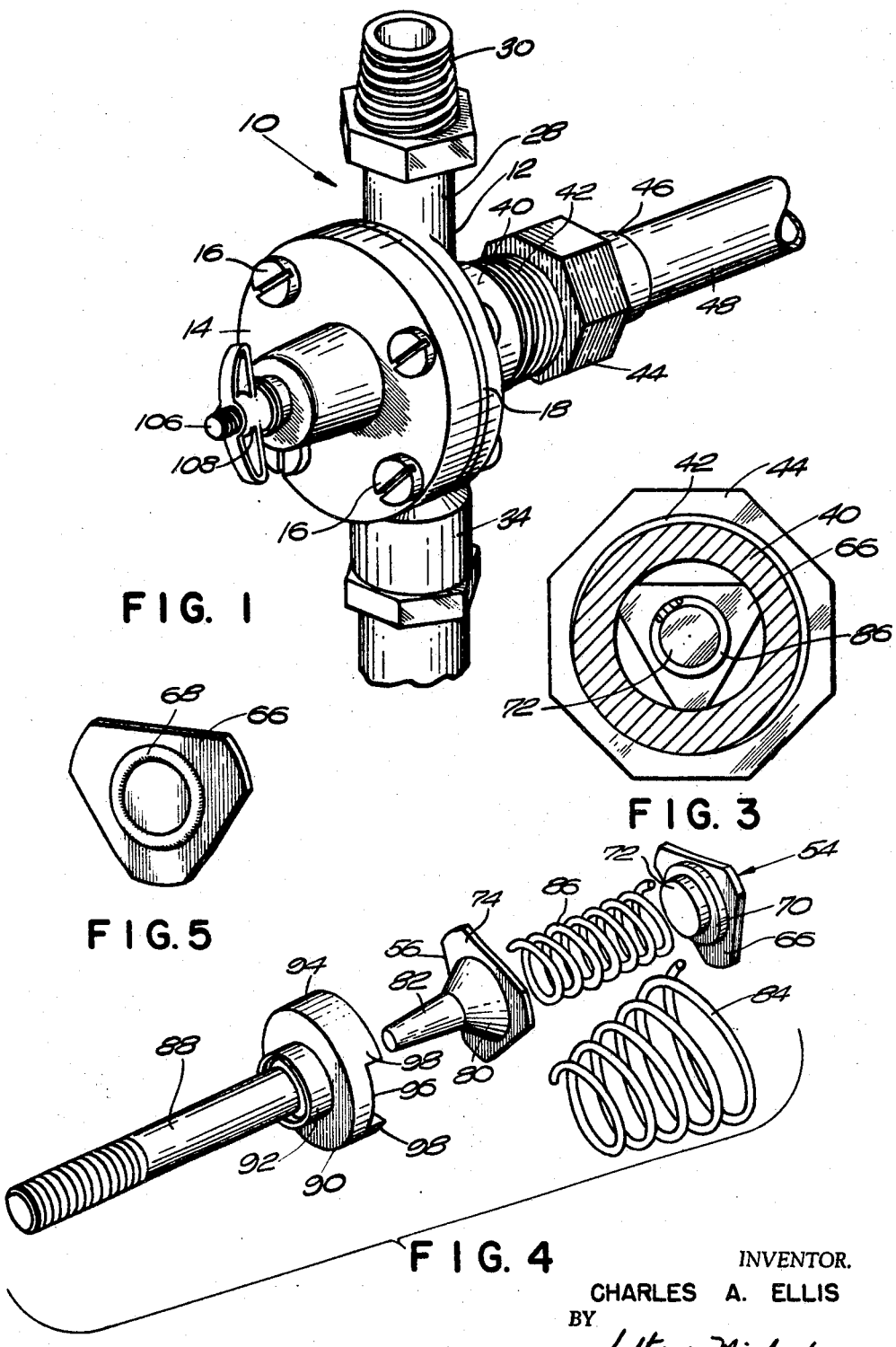
FIG. 1 is a perspective view of a valve constructed in accordance with the instant invention.
Figure 2:
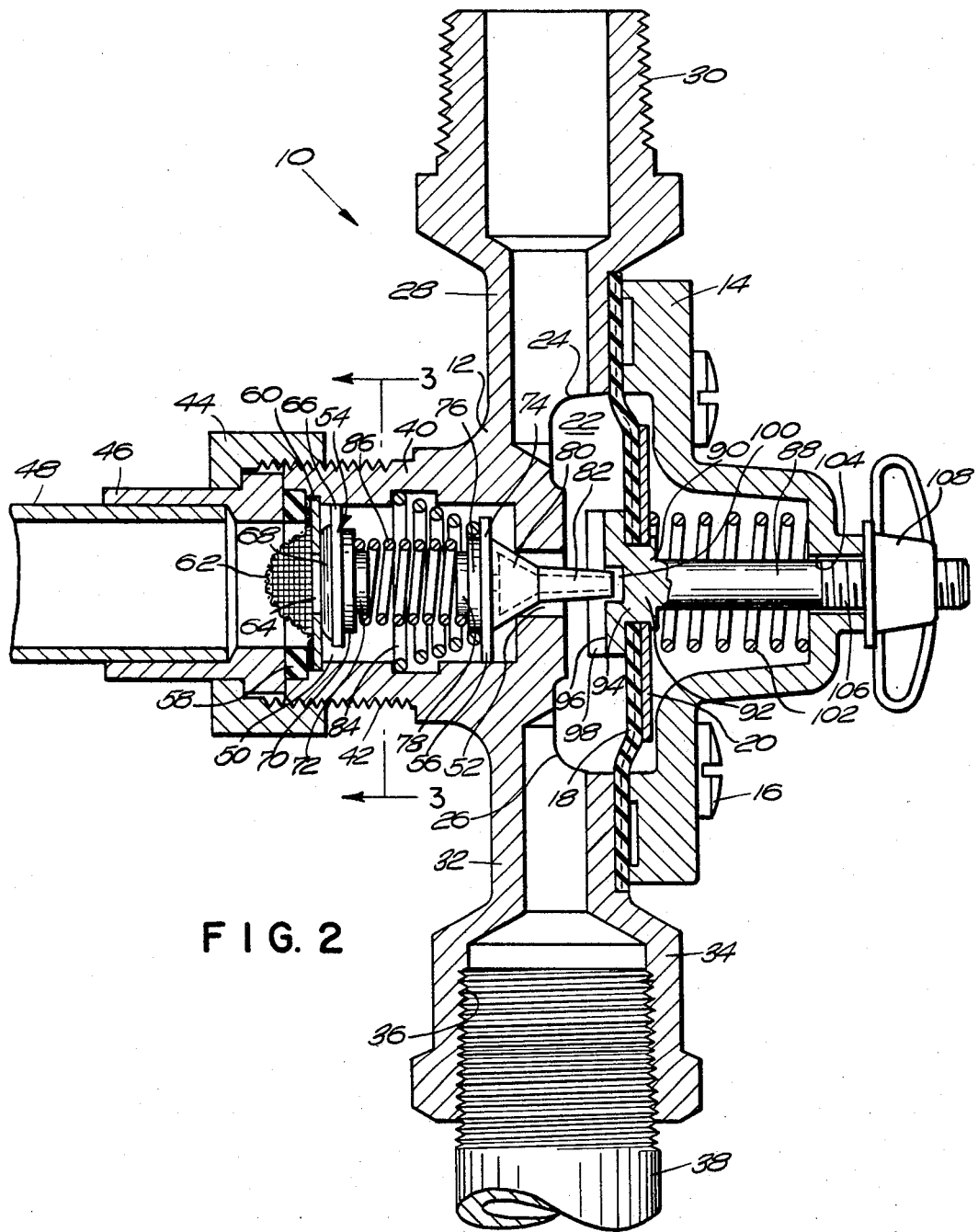
FIG. 2 is a side elevational view, in section, of the valve shown in FIG. 1, on an enlarged scale.

Referring now to the drawings, and more particularly to FIGS. 1 and 2 thereof, an automatic fill and regulating valve constructed in accordance with the instant invention is shown generally at 10. The valve 10 comprises a metallic housing 12 to which is secured a metallic end cap 14 by any suitable means, such as screws 16. Clamped between housing 12 and cap 14 is a diaphragm 18 having a backing plate 20. As will be seen most clearly in FIG. 2, the diaphragm 18 and housing 12 cooperate to define a pressure chamber 22, said chamber having at its upper portion a first outlet port 24 communicating therewith and having at its lower portion a second outlet port 26 communicating therewith. The port 24 communicates with conduit 28, which extends integrally from housing 12 and which has at its outer extremity external male threads 30 for connection to an airout, pipe T, or other connection in the hot water system (not shown). The port 26 communicates with a conduit 32 which also extends integrally from housing 12 and which has at its end an enlarged portion 34 having internal threads 36 for threadedly receiving a connection 38 which leads to an expansion tank or nipple in the hot water system (not shown). Where the connection 38 leads to an expansion tank, it will be understood that the tank may be of the conventional type, without a diaphragm, since the diaphragm 18 in valve 10 effects desired pressure regulation in a manner which will hereinafter become apparent.

Extending integrally from the housing 12 is a third conduit 40 having external threads 42 at its outer end, which threadedly receive a union nut 44 for coupling a sweat union connection 46 in axial alignment with conduit 40. The sweat union connection 46 is adapted to receive therein a conduit 48 through which the cold water supply is introduced to the valve 10.

The conduit 40 defines a passageway 50 that communicates with pressure chamber 22 by means of an aperture 52 provided in the wall of housing 12. The passageway 50 has therein a reverse flow prevention check valve 54 and a regulating or fill valve 56. More specifically, conduit 40 is provided with suitable internal annular shoulders for receiving a gasket ring 58 and a valve seat 60 between which is clamped a straining screen 62. The valve seat 60 is staked permanently into its conduit shoulder. As will be seen clearly in FIG. 2, tightening of union nut 44 on conduit 40 draws the connection 46 inwardly to tightly clamp gasket 58 against its shoulder and the valve seat 60, with screen 62 sandwiched therebetween. The seat 60 is provided with a centrally positioned aperture 64 for permitting flow of the cold water supply therethrough.

The reverse flow prevention check valve 54 comprises a metallic plate 66 of generally triangular configuration (FIG. 5) having molded on the forward surface thereof a rubber ring 68, the diameter of which is larger than the diameter of opening 64 in seat 60. On the rear surface of plate 66 there is molded a rubber disc 70 having a reduced cylindrical projection 72 extending therefrom. The regulating or fill valve 56 also comprises a generally triangular metallic plate 74 similar to the aforedescribed plate 66 and has extending from the rear surface thereof molded rubber discs 76 and 78 identical to the aforedescribed parts 70 and 72. From the opposite surface of plate 74 there extends a frusto-conical portion 80 from which there extends a tapered shank 82. The portions 80 and 82 comprise an outer rubber covering that is molded over metallic core parts, shown in dotted lines in FIG. 2. As will be seen, the frusto-conical part 80 is adapted to seat in aperture 52 and is spring urged to a closed or sealing position with respect to aperture 52 by means of spring 84 which engages plate 74 in peripheral relation with respect to disc 76 and which further engages at its opposite end a suitably provided internal shoulder in conduit 40. A second spring 86 extends between the valves 54 and 56, normally urging both of these valves to closed position. Specifically, the spring 86 bears against the discs 70 and 76 and surrounds the projection 72 and 78. Thus, it will be seen that the valve 54 is normally urged to closed or sealing position against seat 60 by means of spring 86, while the valve 56 is normally urged to closed or sealing position with respect to aperture 52 by means of both spring 84 and spring 86.

Centrally secured to diaphragm 18 and backing plate 20 is a valve stem or shaft 88 having a head portion 90 comprising a hub 92 on which the diaphragm 18 and backing plate 20 are secured by any suitable means. The forward part of head portion 90 comprises a circular disc 94 that is slotted as at 96 so as to define forwardly projecting parts 98. Centrally positioned on the forward face of circular disc 94 is a recess 100 in alignment with and adapted to receive stem 82. A spring 102 is located within cap 14 and bears against backing plate 20 and diaphragm 18 to normally urge said diaphragm toward stem 82. At its rear wall, the cap 14 is provided with a centrally positioned aperture 104 through which the shaft 88 freely and slidingly extends. The rearmost portion of shaft 88 is threaded as at 106 and has threadedly attached thereto a thumb nut 108. It is important to note that the diameter of opening 104 is larger than the external diameter of threads 106, whereupon the threaded portion of shaft 88 may freely and slidingly pass through aperture 104.

The operation of valve 10 will now be described. First of all, it will be understood that when the valve is shipped and installed, the parts are in the relative positions illustrated in FIG. 2. In this position, the thumb nut 108 has been threaded inwardly on the threaded portion 106 of shaft 88 to withdraw the shaft and, also, the diaphragm, as illustrated. With the diaphragm distorted as illustrated and shaft 88 withdrawn to the position shown in FIG. 2, the head portion 90 of shaft 88 has become disengaged from stem 82 whereupon valve 56 is in its closed or seated position due to the urging of springs 84 and 86. With the parts in this position, the valve 10 is installed in the system, it being understood that the threaded extension 30 is connected to an airout, pipe T, or any other suitable connection in the hot-water system. The internally threaded end 36 is connected to a threaded conduit 38 which leads to a conventional expansion tank or to a nipple in the hot-water system if no expansion tank is being used. In any event, as previously explained, if an expansion tank is used, it is not necessary that it have pressure regulating means, since the diaphragm 18 accomplishes this function. The connection 46 is connected to a conduit 48 through which cold water supply may be introduced. It will be seen that the installation of valve 10 is both easy and convenient since a separate and special water pipe provision from the valve to the boiler is not required.

Once the valve 10 has been installed in the above manner, the thumb nut 108 is unthreaded a sufficient distance to allow diaphragm 18 and head portion 90 to move inwardly under the urging of spring 102. As will be apparent, inward movement of head portion 90 will result in engagement of stem 82 by recess 100, whereupon further movement to the left of shaft 88 (when viewing FIG. 2) will force the valve 56 to open or unseated position. As cold water is introduced through conduit 48, the pressure of the water will force valve 54 away from its seat against seat 60 to allow the water to pass through opening 64 and passageway 50, it being understood that the triangular configuration of plate 66 enables the water to flow therearound. The water will flow through aperture 52 into pressure chamber 22, since, as just explained, the valve 56 is unseated. As the water circulates to the expansion tank and to the hot water system, pressure in chamber 22 will commence to build up. When the pressure has reached a predetermined value, normally 12 pounds per square inch, the pressure in chamber 22 will overcome spring 102 and move diaphragm 18 and shaft 88 to the right, viewing FIG. 2, whereupon valve 56 will automatically close in response to the urging of springs 84 and 86. It will be understood that diaphragm 18 and spring 102 are specifically sized so as to allow valve 56 to close when the preselected pressure exists in chamber 22. If at any time pressure in the system falls below the preselected value, then spring 102 will automatically move diaphragm 18 and shaft 88 to the left, thus causing valve 56 to open until the predetermined pressure in chamber 22 again exists.

The slot 96 and projections 98 on head portion 90 insure that there will always be a path for the incoming water when diaphragm 18 and shaft 88 have moved to the left as far as possible. Expressed differently, if the slots 96 and projections 98 were not provided and the disc 94 simply had a flat end surface, then it will be obvious that if the disc 94 were to move into abutment with the inside wall of the aperture 52, the latter would be effectively blocked, thus preventing the flow of water into chamber 22 even though valve 56 is in its open position.

If at any time a test pressure above the preselected fill pressure of the system is desired after installation of the valve 10, this can easily be accomplished simply by pressing inwardly on thumb nut 108, whereupon shaft 88 will be manually held inwardly to maintain valve 56 in open position, no matter what pressure exists in chamber 22. Conversely, if it is ever necessary or desirable to drain the system, the supply water can easily be shut off simply by threading the thumb nut inwardly on shaft 88 until the position of parts illustrated in FIG. 2 has been reached.

The reverse flow prevention check valve 54 functions to prevent hot water in the system from backing up into the supply line.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. In a forced hot water heating system having a water supply conduit, an expansion tank having a conduit in communication therewith, and a third conduit communicating with a boiler or the like, a regulating valve comprising a housing defining a pressure chamber, an inlet passageway communicating with said chamber, means connecting the outer end of said passageway with said water supply conduit, a spring loaded check valve adjacent the outer end of said passageway designed to permit entry of pressurized fluid to said chamber but to prevent backflow therefrom, a fill valve at the inner end of said passageway, means normally urging said fill valve to closed position, thus blocking the passage of fluid to said chamber, a diaphragm in said chamber, actuating means carried by said diaphragm independent from but operatively engaging said fill valve to force said fill valve to open position when the pressure in said chamber falls below a predetermined level, said fill valve comprising a frusto-conical portion having a stem extending therefrom into said chamber, said frusto-conical portion cooperating with an aperture in one wall of said chamber to block flow into said chamber when seated against said aperture, said actuating means comprising a head portion adapted to engage the end of said stem to force said fill valve to open position when the diaphragm moves toward said aperture, said head portion having parts projecting toward said one chamber wall to prevent blocking of said aperture by said head portion, means connected to said actuating means and extending outside of said housing whereby said actuating means may be manually moved in one direction to force said fill valve to open position or in the other direction to disengage from said fill valve whereby to allow resilient closing of the latter, thus permitting said fill valve to be opened or closed no matter what pressure exists in said chamber, a first port in said chamber connected to said expansion tank conduit and a second port in said chamber connected to said third conduit.

References Cited

UNITED STATES PATENTS

| | | | |
|---|---|---|---|
| 583,546 | 6/1897 | Pierson | 137—495 |
| 2,053,931 | 9/1936 | Work | 137—505.4 |
| 2,156,823 | 5/1939 | Stettner | 137—505.42 |
| 2,764,177 | 9/1956 | Paasche | 137—209 |

FOREIGN PATENTS 597,536   9/1925   France.

ALAN COHAN, *Primary Examiner.*